Feb. 26, 1924. 1,484,824
C. H. GAULKE
SLOT GUARD FOR AUTOMOBILE LEVERS
Filed Dec. 23, 1922
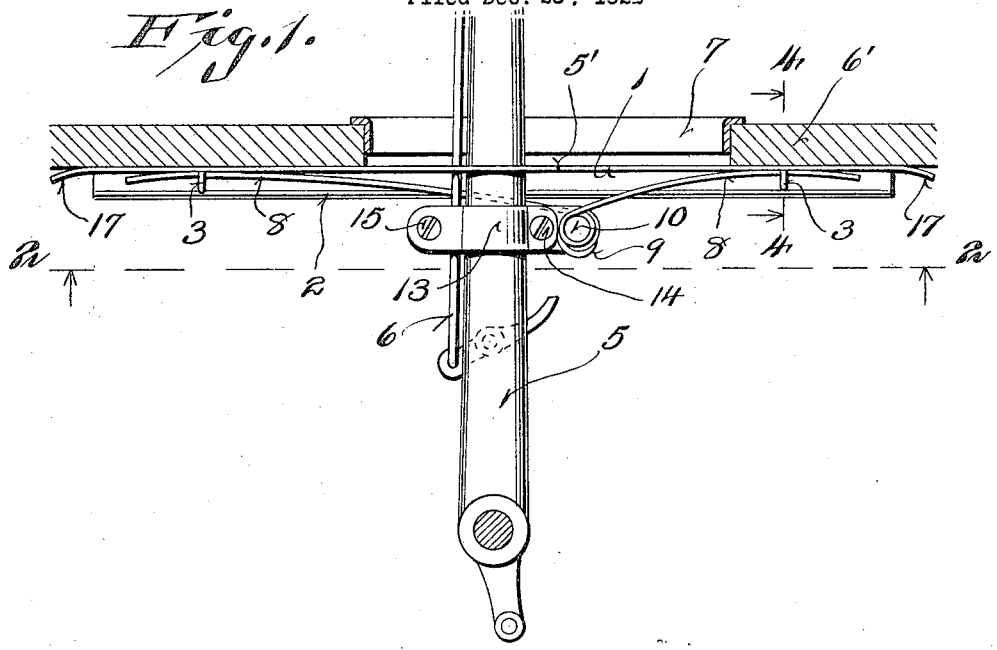
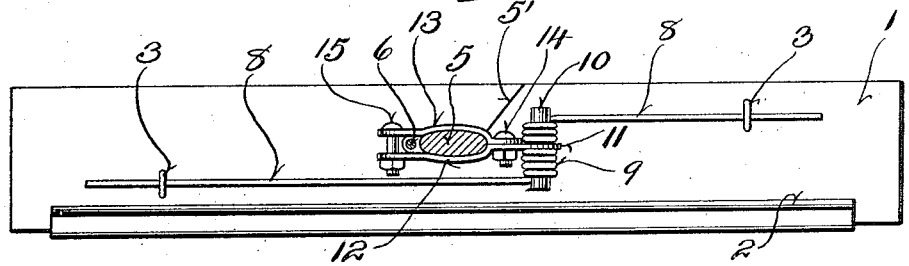
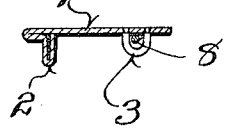 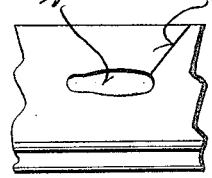
Inventor
Charles H. Gaulke Patented Feb. 26, 1924.

1,484,824

UNITED STATES PATENT OFFICE.

CHARLES H. GAULKE, OF MILWAUKEE, WISCONSIN.

SLOT GUARD FOR AUTOMOBILE LEVERS.

Application filed December 23, 1922. Serial No. 608,779.

*To all whom it may concern:*

Be it known that I, CHARLES H. GAULKE, a citizen of the United States, and resident of Milwaukee, in the county of Milwaukee and State of Wisconsin, have invented certain new and useful Improvements in Slot Guards for Automobile Levers; and I do hereby declare that the following is a full, clear, and exact description thereof.

This invention relates to slot guards for automobile levers and is in general an improvement over the invention disclosed in U. S. Patent Number 1,434,813 issued to me November 7, 1922.

Objects of this invention are to provide a slot guard for automobile levers which will effectively seal the lever slot in all positions of the lever, which will allow the utmost freedom of movement of the lever, which minimizes friction, and which has a floating contact with the control lever.

Further objects are to provide a slot guard which may be quickly applied to the lever by an unskilled person, without necessitating dismantling any portion of the automobile, which may be readily manufactured from standard or stock material, and which combines simplicity of construction with characteristics making for long service.

An embodiment of the invention is shown in the accompanying drawings, in which:

Figure 1 is a side elevation of the slot guard applied to an automobile lever, such figure showing a fragmentary portion of an automobile.

Figure 2 is a sectional view on a line 2—2 of Figure 1.

Figure 3 is a detail of a portion of the guard.

Figure 4 is a sectional view of the guard, said section being taken on the line 4—4 of Figure 1.

Referring more particularly to the drawings, it will be seen that the slot guard comprises a plate 1, which may be of mild steel and which is provided with a longitudinally extending reinforcing rib, projecting downwardly from the under side of the slot guard and preferably formed integrally with the body of the plate, as for instance, by folding over a lateral extension of the plate as shown in Figure 4. The underside of this slot guard is further provided with a pair of eyelets 3 which may be positioned upon the under side of the guard and upon opposite sides of the longitudinal center line, as shown in Figure 2. These eyelets may be separate members secured to the plate if desired, as shown in the drawing, or may be struck up from the plate in a well known manner. The guard is further provided with an oval aperture 4 which is adapted to receive the control lever 5 of the automobile. A diagonal slot 5' extends from this aperture to the outer edge of the guard as shown in Figure 3 and facilitates the positioning of the guard about the lever 5. The slot is so formed that it permits the lever 5 together with its rod 6 to freely pass therethrough while however, fitting such parts with a fair degree of accuracy.

Means are provided for resiliently holding the guard in intimate contact with the underside of the floor 6' of the automobile so as to close the aperture 7 which is cut in the floor to accommodate the control lever 5. The resilient means comprises a spring having outwardly extending arms 8 freely received within the eyelets 3 and connected by a coiled portion 9. The arms 8 tend to open upwardly (see Figure 1) and force the guard upwardly against the underside of the floor of the automobile. The coiled portion of the spring is carried by means of a pin 10 secured to the outwardly extending arm 11 of one of the clamping members 12. This clamping member cooperates with a second clamping member 13 to bind the control lever 5 between them. A convenient way of securing this result is by means of the bolts 14 and 15 which tightly draw the clamping members into engagement with the control rod. It will be noted that upon one side of the control rod 5 the members 12 and 13 may be drawn into contact with each other if desired. However, upon the other side of the control lever the members are preferably so associated as to leave a space for the rod 6 as may be seen from Figure 2. It is to be noted that the members 12 and 13 conform to the curvature of the control lever 5 and definitely maintain the guard 1 in its correct direction, so that it will, in all positions of the lever 5, completely close the aperture 7.

It is to be noted that the terminals of the guard 1 are slightly curved as indicated at 17 so as to provide a rounded forward and rear edge to facilitate the sliding of the plate or guard 1. A convenient way of forming the guard is to stop the reinforcing rib 4, short of the ends of the guards so as to permit the ready bending of the terminal portions 17 downwardly to provide the forward and rear curved edge.

It will thus be seen that a slot guard has been provided which will automatically adjust itself to the floor of the automobile in all positions of the control lever and that in effect, a floating connection has been secured between the guard and the control lever. The guard is preferably formed of a relatively hard sheet metal such for instance, as mild steel, other materials may also be used. It is however, desirable to provide a perfectly smooth upper surface for the guard so that it may freely slide back and forth upon the under side of the floor or other partition of the automobile with a minimum of friction.

It will further be seen that the various portions of the slot guard will not rattle from the jarring of the automobile as they are at all times securely held in their correct positions.

A further point to be noted is that by this invention the slot guard has been reduced to its simplest terms, using in effect merely a single sliding guard plate and resilient means clamped to the control lever and movably associated with the guard plate, thereby dispensing with guides, flexible members or other means for closing the aperture through the floor of the automobile and guiding the guard plate.

A further feature of this invention which it is desired to emphasize, is the readiness with which this construction lends itself to ordinary processes of manufacture. The several elements composing the slot guard may be most readily formed and may be produced from standard material or standard stock.

It will be noted that an unskilled person may readily apply the device to an automobile without dismantling any of the parts of the automobile.

Obviously, other forms of resilient means may be provided and the invention may be embodied in other forms than that shown in the drawings. It is intended, therefore, that the invention is to be limited only as defined in the appended claims.

I claim:

1. A slot guard adapted for attachment to an automobile lever beneath the floor, said guard comprising a plate adapted to contact with the underside of said floor and having an aperture for the reception of said lever, clamping means independent of said plate and adapted to engage said lever beneath the plate, and resilient means bearing downwardly against said clamping means and upwardly against said plate, whereby said plate is free to adjust itself throughout its entire extent independently of the angular position of said lever.

2. A slot guard for closing the floor slots for automobile control levers comprising an elongated plate having downturned ends and a longitudinal reinforcing rib and having an aperture for said lever and an entrance slot communicating with said aperture, and resilient means secured to said lever independently of said plate and having a portion slidingly engaging the underside of said plate, whereby a floating connection is secured between said lever and plate.

3. A slot guard for closing the floor slots for automobile control levers comprising a guard plate adapted to contact with under side of the floor and having an aperture for the reception of said lever, a clamp separate from said plate for engaging said lever beneath said plate, resilient means pivotally carried by said clamp and having outwardly extending arms, and guides carried by said guard plate for loosely receiving said arms.

In testimony that I claim the foregoing I have hereunto set my hand at Milwaukee, in the county of Milwaukee and State of Wisconsin.

CHARLES H. GAULKE.